(12) United States Patent
Flynn et al.

(10) Patent No.: US 7,028,989 B2
(45) Date of Patent: Apr. 18, 2006

(54) TIRE CARRIER

(75) Inventors: Charles Flynn, Davisburg, MI (US); Madhu Posani, Bloomfield Hills, MI (US); Rosanne Weitzel, Clinton Township, MI (US); John Truckey, Mancelona, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 176 days.

(21) Appl. No.: 10/723,694

(22) Filed: Nov. 26, 2003

(65) Prior Publication Data

US 2004/0188582 A1    Sep. 30, 2004

Related U.S. Application Data

(60) Provisional application No. 60/441,496, filed on Jan. 21, 2003, provisional application No. 60/429,843, filed on Nov. 27, 2002.

(51) Int. Cl.
    *B66D 1/00*    (2006.01)
(52) U.S. Cl. ............. 254/323; 414/466; 224/42.23
(58) Field of Classification Search ............. 254/323, 254/272, 273, 274, 42.12, 42.23; 414/463–466
    See application file for complete search history.

(56) References Cited

U.S. PATENT DOCUMENTS

| | | | | |
|---|---|---|---|---|
| 2,809,518 A | * | 10/1957 | Grandstaff | 73/862.471 |
| 3,031,169 A | * | 4/1962 | Robinson et al. | 254/273 |
| 3,759,489 A | * | 9/1973 | Jones | 254/273 |
| 3,801,071 A | * | 4/1974 | Barron | 254/267 |
| 4,034,963 A | * | 7/1977 | Warman et al. | 254/273 |
| 4,287,759 A | * | 9/1981 | Cooper | 73/862.451 |
| 4,318,533 A | * | 3/1982 | Port | 254/273 |
| 4,613,273 A | | 9/1986 | Wagner | |
| 4,997,164 A | | 3/1991 | Kito et al. | |
| 5,188,341 A | | 2/1993 | Greaves | |
| 5,368,280 A | | 11/1994 | Ng | |
| 5,662,311 A | * | 9/1997 | Waedekin et al. | 254/273 |
| 5,791,859 A | | 8/1998 | Simnacher | |
| 6,092,790 A | | 7/2000 | Dobmeier et al. | |
| 6,267,546 B1 | | 7/2001 | Oxyer et al. | |
| 6,293,522 B1 | | 9/2001 | Dobmeier et al. | |
| 6,299,403 B1 | | 10/2001 | Lee | |
| 6,390,452 B1 | | 5/2002 | Dobmeier et al. | |
| 6,427,981 B1 | | 8/2002 | Kingsbury et al. | |
| 6,499,724 B1 | | 12/2002 | Dobmeier et al. | |
| 6,527,252 B1 | | 3/2003 | Dziedzic | |
| 6,547,219 B1 | | 4/2003 | Dobmeier et al. | |

(Continued)

*Primary Examiner*—Emmanuel Marcelo
(74) *Attorney, Agent, or Firm*—Porter Wright Morris & Arthur; Richard M. Mescher; Dean B. Watson

(57) ABSTRACT

A tire carrier assembly for storing a spare tire on a vehicle which includes a carrier adapted for supporting the spare tire and a winch operatively connected to the carrier to raise and lower the carrier between a stowed position wherein the carrier is inaccessible and a deployed position wherein the carrier is accessible. The winch has a flexible member secured to the carrier and one of an electric motor and a manual device which selectively raises and lowers the carrier between the stowed and deployed positions. A monitoring device is located adjacent the winch and a control module is operably connected to the monitoring device to monitor movement of the carrier from the deployed position toward the stowed position.

20 Claims, 16 Drawing Sheets

U.S. PATENT DOCUMENTS 6,554,253 B1  4/2003  Dobmeier et al.
6,561,489 B1 *  5/2003  Wakefield .................. 254/323
6,631,834 B1  10/2003  Slovick
2002/0040979 A1 *  4/2002  Raz et al. .................. 254/323

* cited by examiner

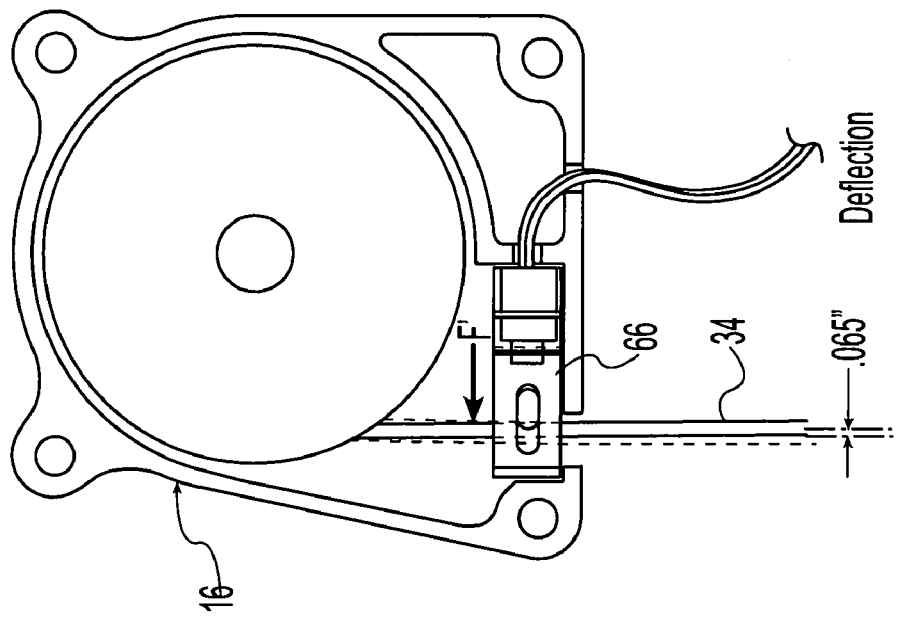
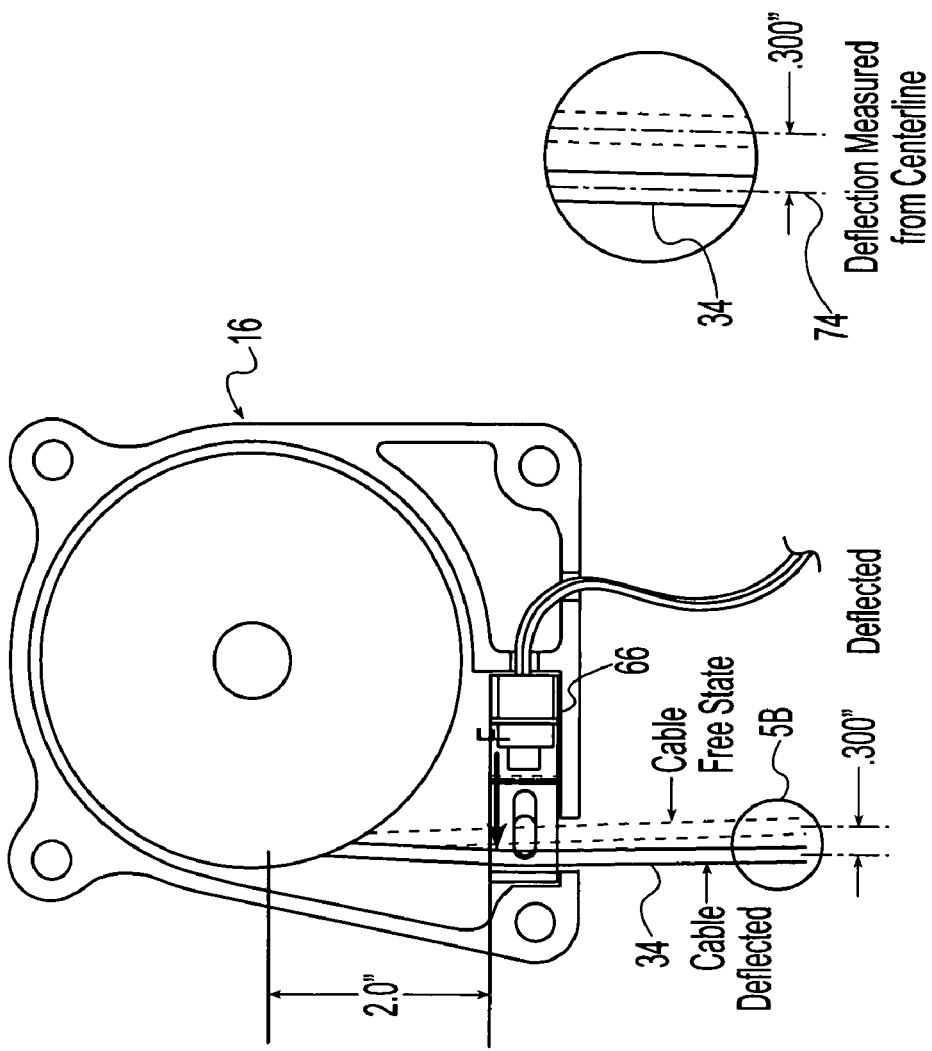
*Fig. 5A*  *Fig. 5B*  *Fig. 5C*

TIRE CARRIER

CROSS-REFERENCE TO RELATED APPLICATIONS

This application claims the benefit of provisional patent application No. 60/429,843 filed on Nov. 27, 2002 and provisional patent application No. 60/441,496 filed on Jan. 21, 2003, the disclosures of which are expressly incorporated herein in their entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a tire carrier for a motor vehicle and, more particularly, to such a tire carrier which stores a spare tire beneath the motor vehicle.

BACKGROUND OF THE INVENTION

Vehicles with inflatable tires such as passenger cars, light and heavy duty trucks, tractor trailers, buses, commercial delivery vehicles, among other motorized forms of transportation and trailers pulled by such vehicles are conventionally equipped with spare tires. Some spare tires are stored under the vehicle using a tire carrier which includes a tire winch for raising and lowering the spare tire between a raised or stored position and a lowered or accessed position. The winch typically raises and lowers the spare tire using a flexible member such as a cable or cord which is wound and unwound on a spool or reel. A secondary latch is often provided to secure the spare tire in the stored position. If the flexible member or winch fails while the spare tire is in the stored position, the secondary latch ensures that the spare tire remains in the stored position.

Various powered tire carriers have been proposed for storing spare tires beneath a motor vehicle. See for example, U.S. Pat. Nos. 4,613,273, 5,368,280, 5,791,859, the disclosures of which are expressly incorporated herein in their entireties by reference.

While these prior tire carriers may adequately stow spare tires beneath motor vehicles under ordinary circumstances, several problems can arise. For example, the spare tire may not be properly located in the stowed position and it is difficult for the operator to see the problem because the spare tire is located beneath the motor vehicle. Additionally, even if the spare tire is properly stowed, the position of the spare tire can change over time such as, for example, due to cable stretching and it is difficult for the operator to see the problem since the spare tire is located below the motor vehicle. Furthermore, the condition of the spare tire itself can change over time such as, for example, loosing inflation and it is difficult for the operator to see the problem since the spare tire is located below the vehicle. Accordingly, there is a need form an improved tire carrier assembly.

SUMMARY OF THE INVENTION

The present invention provides a tire carrier assembly which overcomes at least some of the above-noted problems of the related art. According to the present invention, a tire carrier assembly includes, in combination, a carrier adapted for supporting the spare tire and a winch operatively connected to the carrier to raise and lower the carrier between a stowed position wherein the carrier is inaccessible and a deployed position wherein the carrier is accessible. The winch has a flexible member secured to the carrier and one of an electric motor and a manual device which selectively raises and lowers the carrier between the stowed and deployed positions. A monitoring device is adjacent the winch and a control module is operably connected to the monitoring device to monitor movement of the carrier from the deployed position toward the stowed position.

According to another aspect of the present invention, a tire carrier assembly includes, in combination, a carrier adapted for supporting the spare tire and a winch having a flexible member operatively connected to the carrier and having an actuation member connected to the flexible member to raise and lower the carrier between a first position and a second position relative to the vehicle. A monitoring device is adjacent the flexible member to measure tension in the flexible member when the tire carrier is raised from the first position to the second position. A control module is operably connected to the monitoring device to monitor a tension force level in the flexible member as the tire carrier moves from the first position toward the second position. The control module is programmed to prevent further movement of the carrier toward the second position when the tension force level in the flexible member exceeds a predetermined tension level.

According to another aspect of the present invention, a tire carrier assembly includes, in combination, a carrier adapted for supporting the spare tire and a winch having a flexible member operatively connected to the carrier and having one of an electric motor and a manual device connected to the flexible member to raise and lower the carrier. A monitoring device adjacent the winch to control movement of the carrier between a stowed position wherein the carrier is inaccessible and a deployed position wherein the carrier is accessible. The monitoring device includes at least one of a tension monitoring device, a force switch, a limit switch, a hall effect sensor, a hall effect device, a stress monitoring device, a pressure sensor, a contact position sensor, and a non-contact position sensor.

According to another aspect of the present invention, a tire carrier assembly includes, in combination, a carrier adapted for supporting the spare tire and a winch having a flexible member operatively connected to the carrier and having one an actuation member to raise and lower the carrier. Means are provided for monitoring movement of the carrier from one position toward another position so that the spare tire is moved toward the another position and for providing a signal to prevent further movement of the carrier toward the another position when movement of the carrier produces a monitored condition having a predetermined level.

According to another aspect of the present invention, a method of storing and accessing a spare tire on a vehicle, includes the steps of placing the spare tire on the tire carrier. The tire carrier includes a winch assembly and a flexible member and the winch assembly is connected to one of a motor and a manual device. The spare tire is raised from a deployed position wherein the spare tire is accessible toward a stowed position wherein the spare tire is inaccessible. A current condition is monitored including at least one of location of the tire carrier relative to the vehicle, tension level in the flexible member, and length of the flexible member. The raising step is discontinued when the current condition corresponds to a predetermined level.

According to another aspect of the present invention, a method of storing and accessing a tire carrier assembly on a vehicle, includes the steps of moving the tire carrier from a stowed position wherein the tire carrier is inaccessible to a deployed position wherein the tire carrier is accessible and measuring one of position of the tire carrier relative to the vehicle, tension level in the flexible member, stress in a member supporting the tire carrier, output of a pressure sensor, and deployed length of the flexible member relative to the vehicle. At least a portion of the movement of the tire carrier is monitored from the deployed position toward the stowed position.

From the foregoing disclosure and the following more detailed description of various preferred embodiments it will be apparent to those skilled in the art that the present invention provides a significant advance in the technology and art of tire carriers. Particularly significant in this regard is the potential the invention affords for providing a high quality, reliable, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 5A is an enlarged and fragmented elevational view similar to FIG. 3 but showing example 1;

FIG. 5B is an enlarged view taken from circle 5B in FIG. 5A;

FIG. 5C is an enlarged and fragmented elevational view similar to FIG. 5A but showing example 2;

Figure 1:
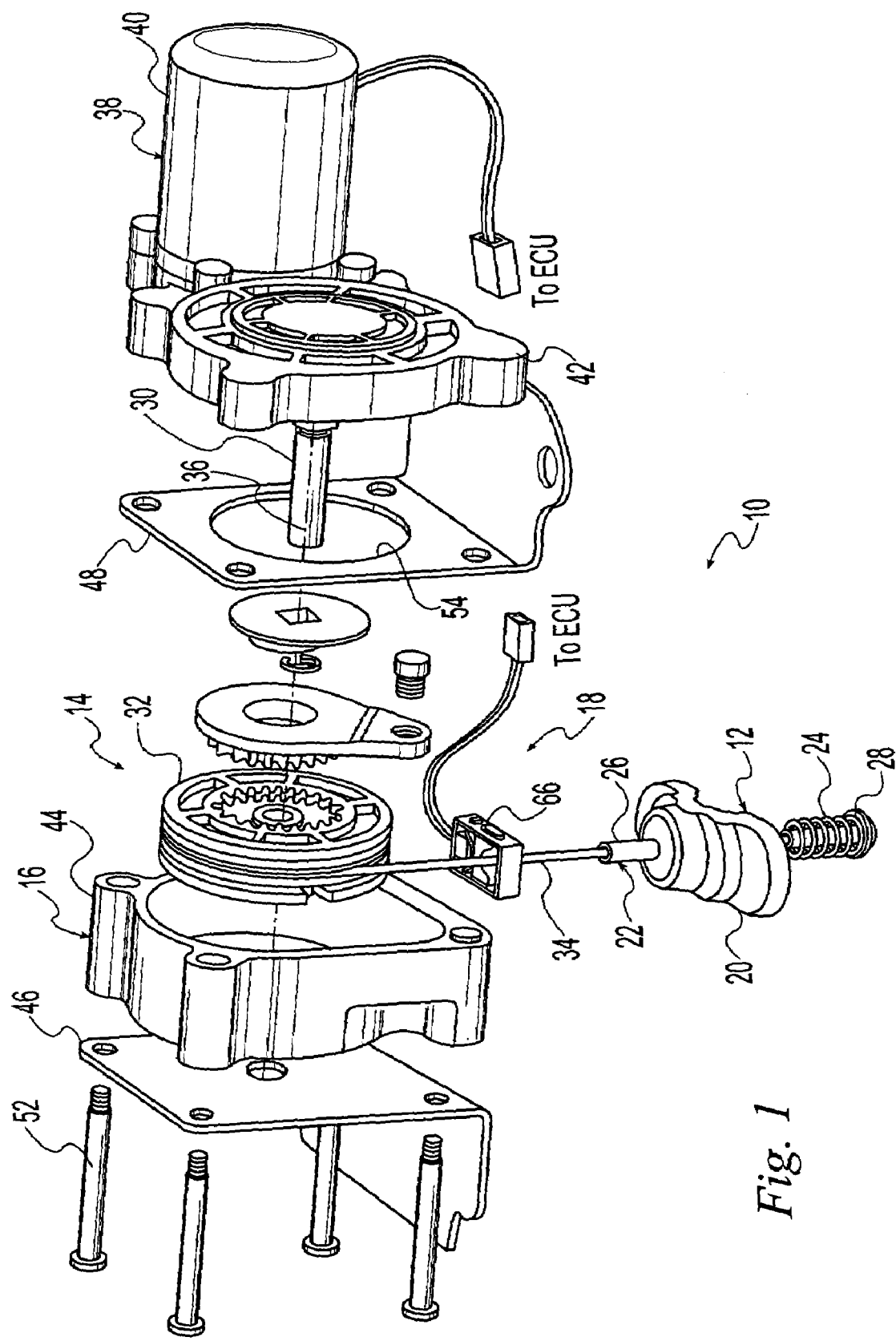
FIG. 1 is an exploded view of a tire carrier assembly according to a preferred embodiment of the present invention.

It should be understood that the appended drawings are not necessarily to scale, presenting a somewhat simplified representation of various preferred features illustrative of the basic principles of the invention. The specific design features of a tire carrier for a motor vehicle as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the tire carriers illustrated in the drawings. In general, up or upward refers to an upward direction within the plane of the paper in FIG. 1 and down or downward refers to a downward direction within the plane of the paper in FIG. 1. Also in general, fore or forward refers to a direction toward the front of the vehicle, and aft or rearward refers to a direction toward the rear of the vehicle.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved tire carriers disclosed herein. The following detailed discussion of various alternative and preferred embodiments will illustrate the general principles of the invention with reference to tire carriers for a motor vehicle such as a truck, van, or sport utility vehicle (SUV). Other embodiments suitable for other applications will be apparent to those skilled in the art given the benefit of this disclosure such as for example for use with automobiles, recreational vehicles, trailers, off road vehicles such as dune buggies, industrial equipment, golf carts, and the like.

Referring now to the drawings, FIG. 1 shows a tire carrier assembly 10 according to a preferred embodiment of the present invention. The illustrated tire carrier assembly 10 includes a tire carrier 12 for carrying and supporting a spare tire 11 thereon, a winch assembly 14 for raising and lowering the tire carrier 12 between an upper or storing position and a lower or accessing position, and a housing assembly 16 for at least partially housing the winch assembly 14 and mounting the various components to the motor vehicle. The illustrated tire carrier assembly 10 also includes a monitoring sensor or device 18 for monitoring operation of the tire carrier assembly 10 as described in more detail hereinafter. The storing position is preferably adjacent the bottom of the motor vehicle wherein access is not provided to the tire carrier 12 or the spare tire. The accessing position is preferably spaced below the storing position on or near the ground surface wherein access is provided to the tire carrier 12 and the spare tire 11 so that the spare tire can be placed on and removed from the tire carrier 12. Optionally, a secondary latch assembly (not shown) may be provided for securing or confining the tire carrier 12 in the storing position as disclosed in U.S. Pat. No. 6,267,546 or U.S. patent application Ser. No. 10/127,298 filed on Apr. 22, 2002, the disclosures of which are both expressly incorporated herein in their entireties by reference.

The tire carrier 12 includes a tire plate 20, a swivel 22, and a biasing member 24. The tire plate 20 is adapted for supporting the spare tire 11. The illustrated tire plate is adapted to support a wheel or rim 11 a of the spare tire 11. It is noted that the tire plate 20 can have many different forms within the scope of the present invention. The swivel 22 vertically extends through the tire plate 20 and includes a tubular portion 26 which extends above the tire plate 20. The tubular portion 26 can take on many sizes and shapes depending on the application requirements and the interaction with other components as will be discussed hereinafter. The illustrated tubular portion 26 is cylindrical and extends longitudinally through the tire plate 20. The biasing member 24 biases the tire plate 20 in an upward direction to maintain tension as is known in the art. The illustrated biasing member 24 is a coil compression spring acting between a flange 28 and a lower side of the tire plate 20. Alternatively, the biasing member 24 can be a finger spring device, a resilient member such as an elastomeric member, a combination of a spring and elastomeric member, or the like.

The winch assembly 14 includes a shaft 30, a spool or reel 32 that is rotatably mounted on the shaft 30, and an elongate flexible member 34 which is wound and unwound upon the reel 32. The flexible member 34 can be a cable, rope chain, cord, or the like which is selectively wound onto and off of the reel 32. The shaft 30 extends outwardly from the housing assembly 16 and is mounted for rotation about its central axis 36. The reel 32 is mounted for rotation with the shaft 30 and is adapted to wind and unwind the flexible member 34 thereon upon rotation of the shaft by an actuation member 38. The illustrated actuation member is a motor 40 but other suitable means can be utilized such as for example a manually-operated device or the like. The motor 40 is operatively coupled to the shaft 30 through a gearbox 42 to increase the output torque and speed of rotation. When the motor 40 is not activated, a self-locking feature of the gearbox 42 prevents counter rotation of the reel 32 and undesirable movement of the tire carrier 12 from the storing position to the accessing position due to tire weight and/or tension force in the flexible member 34. Optionally, the motor 40 is coupled directly to the reel 32 so as to eliminate the gearbox 42. However, in this instance it is found advantageous that the motor 40 have a mechanical stop such as, for example, a solenoid activated brake or that the winch assembly 14 have a secondary lock to prevent the reel 32 from counter rotating and the tire carrier 12 from undesirably moving from the stowed position to the accessing position. The flexible member 34 has a first or upper end secured to the reel 32 and a second or lower end extending through the tubular portion 26 if the swivel 22 such that the tire plate 20 is raised to the stowing position and lowered to the accessing position as the flexible member 34 is wound and unwound on the reel 32 respectively. It is noted that any suitable winch assembly known in the art can be utilized within the scope of the present invention.

The housing assembly 16 includes a housing 44, a cover plate 46, and a mounting bracket or cover 48. The housing 44 is generally shaped and sized to enclose the reel 32 and the flexible member 34 within a hollow interior space or cavity. The housing 44 partially forms the cavity with an open side for insertion of the reel 32 therethrough when the cover plate 46 is not attached thereto. The housing 44 also has a passage 50 (FIG. 3) in its bottom wall to permit passage of the flexible member 34 from the reel 32 to the swivel 22. The illustrated cover plate 46 is generally planar and is adapted to be secured by conventional fasteners 52 through suitable apertures in bosses in the housing 44 to close the open side of the housing 44 when secured thereto. The fasteners 52 securing the cover plate 46 extend through apertures the bosses in the housing 44 to cooperate with the mounting bracket 48 and the gearbox 42. The mounting bracket 48 and the cover plate 46 are on opposite sides of the housing 44. The mounting bracket 48 includes a hole 54 to form a passage through which the shaft 30 can pass from the gearbox 42 to the reel 32. The housing 44, the cover plate 46 and the mounting bracket 48 may be made of any suitable material including thermoplastic, thermoset plastic, steel, aluminum, and composite materials.

The illustrated motor 40 is a permanent magnet direct current DC motor, which can selectively rotate in either direction depending on the provided control signal. Alternatively, the motor 40 may be a hydraulic, pneumatic or vacuum motor that is connected by conventional means to a corresponding supply source and regulation devices as are well known in the art.

Figure 2:
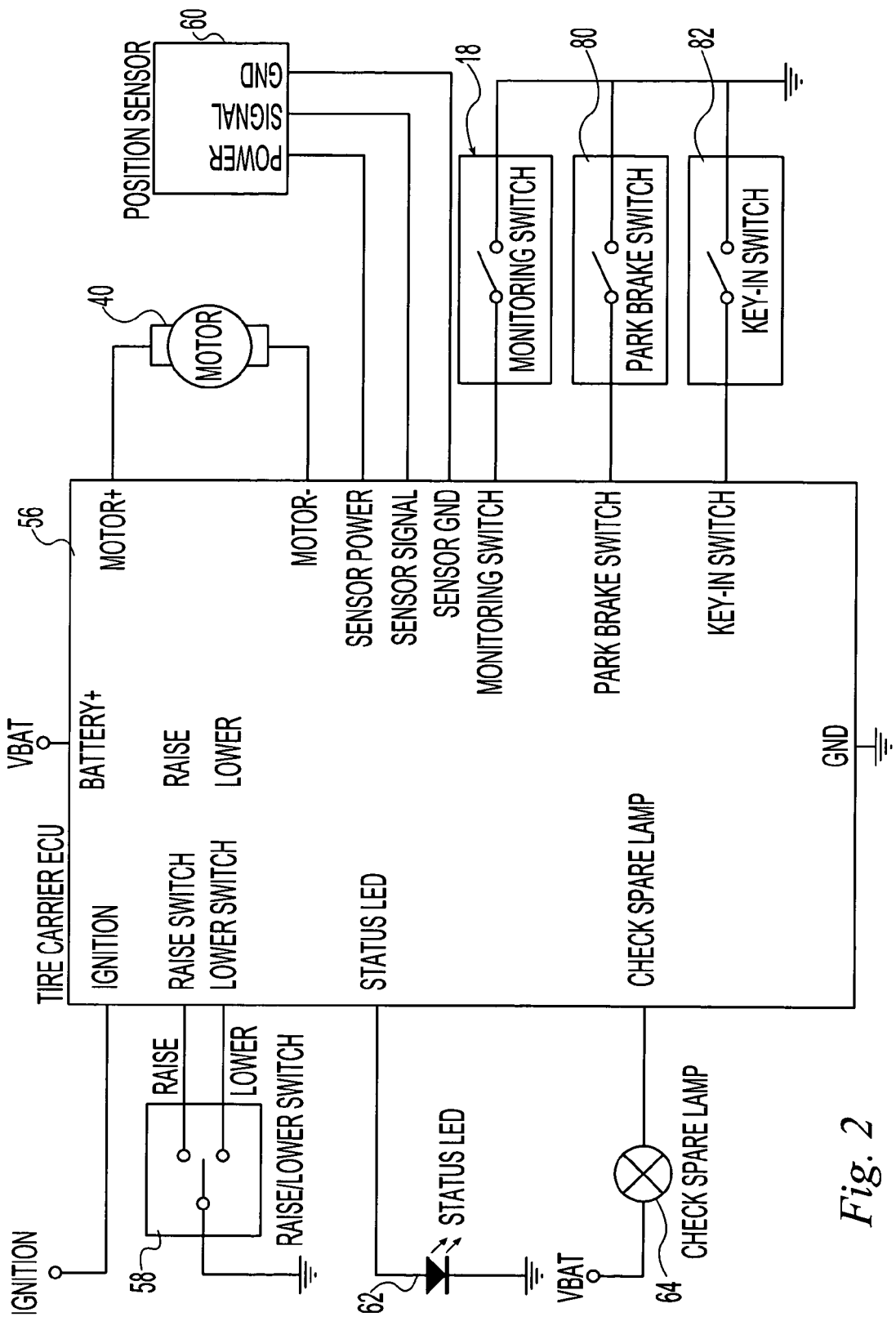
FIG. 2 is a schematic diagram of the electronic control unit (ECU) used to control operation of the tire carrier assembly of FIG. 1.

As shown in FIG. 2, operation of the motor 40 is controlled by the electronic control module (ECU) or controller 56, the monitoring device 18, and an operator-input device 58. The illustrated motor 40 is provided with a position sensor 60 for sensing rotations and providing electrical signals representative of the rotations. A suitable sensor 60 is a Hall-effect device or sensor or a non-contact rotary position sensor, such as a resolver or optical encoder and a sensor-less position control of the motor 40, such as a ripple current measuring device can be used. The position sensor 60 may be integral with the motor 40 or alternatively the position sensor 60 can be separate from the motor 40 and located at any suitable location such as on the shaft 30 or the reel 32. The sensor is electrically connected in a suitable manner to the ECU 56 to provide signals to the ECU 56. Those skilled in the art will recognize that sensing rotations with a reel of known diameter enables the length of the flexible member which is wound or unwound from the reel 32 to be known. It is noted that suitable torque limiters and the like can also be provided in a well known manner.

The ECU 56 is provided with suitable logic and memory electronics for operating the motor 40 and the winch assembly 14. The operator input device 58 sends signals to the ECU 56 to rotate the reel 32 as desired to lower the tire carrier 12 from the storing position to the accessing position or raise the tire carrier 12 from an accessing position to the storing or stowed position. The illustrated operator input device 58 is a center-off momentary toggle switch. Alternatively, the input device 58 can include a rocker switch that is well known in the art or any other suitable type of switch or control device. Also preferably provided is a status indicator such as the illustrated light emitting diode (LED) device 62. The input device 58 and the LED device 62 can be mounted in a number of locations in the vehicle, such as, the dashboard, the rear jack location of a SUV or in a weather-tight enclosure on the outside of the vehicle, preferably, the input device 58 is biased to an off condition or position. When the operator toggles the center of switch of the input device 58 in one direction, it sends a signal to the ECU 56 to lower the tire carrier 12 to the accessing position. Toggling the switch of the input device 58 in the other direction sends a signal to the ECU 56 to raise the tire carrier to the storing or stowed position. While the tire carrier 12 is being lowered to the accessing position, the LED device 62 blinks and then stays illuminated while the tire carrier 12 is in the down condition. When the tire carrier 12 is being raised to the storing or stowed position, the LED device 62 blinks. The LED device 62 stays off when the tire carrier 12 is in the stored position. Any signal fault detected by the ECU 56 causes the status LED device 62 to illuminate, until the fault is cleared. Further optionally, warning indicator such as a check spare tire lamp 64 may be installed on the dashboard and a signal from the ECU 56 is sent to the lamp 64 in the event that the height of the spare tire 11 on the tire carrier 12 should be adjusted after the spare tire 11 was initially stored in the storing position. This would indicate to the driver that the spare tire 11 was loosing air pressure or the flexible member 34 has stretched.

The monitoring device 18 preferably limits upward or downward movement of the tire carrier 12 as it is being moved into and out of the storing position. The illustrated monitoring device 18 includes the position sensor 60 described hereinabove. The illustrated monitoring device 18 is adapted to stop the motor 40 after a predetermined flexible member travel or distance. The illustrated monitoring device 18 also includes a flexible member tension or deflection device 66 that is described in more detail hereinafter.

Travel of the flexible member 34 is indicated by the position sensor 60 when a predetermined number of rotations have been made by the motor 40 or by another rotating component such as the shaft 30. Signals from the position sensor 60 indicating the number of rotations of the motor 40 or the shaft 30 are sent to the ECU 56 for processing. The flexible member travel information is utilized to stop rotation of the motor 40 or the shaft 30 if the flexible member 34 travels a predetermined distance. The predetermined distance can be, for example, by way of non limiting example, a certain percentage (e.g. 5%) more than the flexible member 34 has traveled the previous time the tire carrier assembly 10 was used. When the predetermined distance is traveled, the ECU 56 causes the motor 40 to stop.

Figure 3:
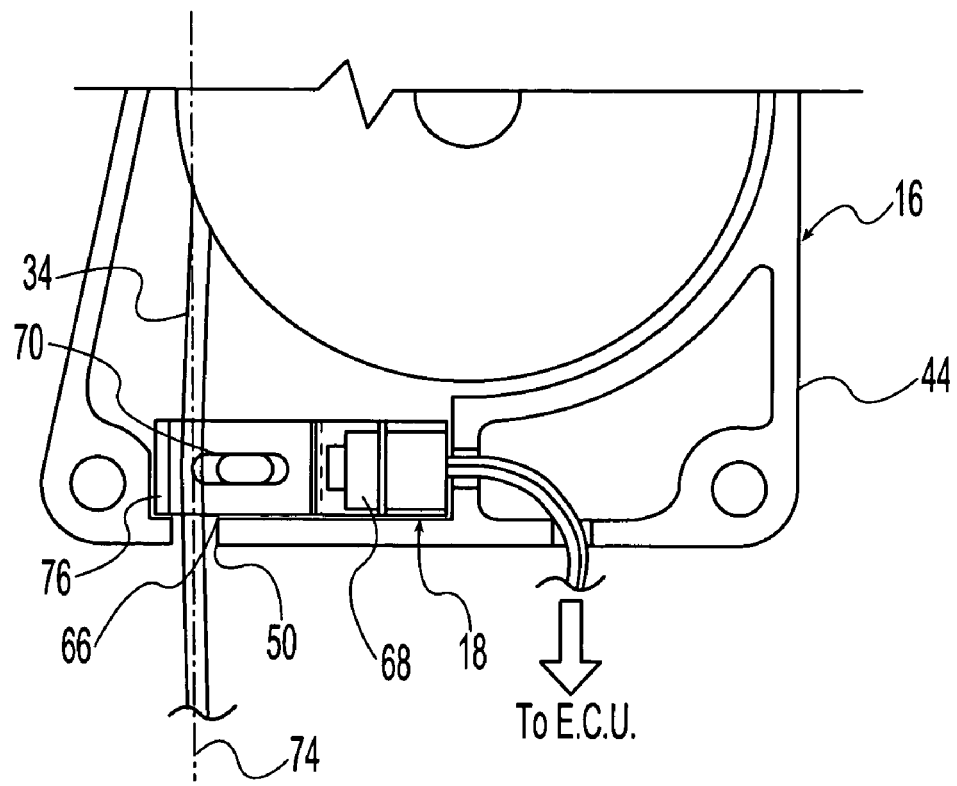
FIG. 3 is an enlarged and fragmented elevational view of a housing and tension device of the tire carrier assembly of FIGS. 1 and 2, wherein some components are removed for clarity.
Figure 4:
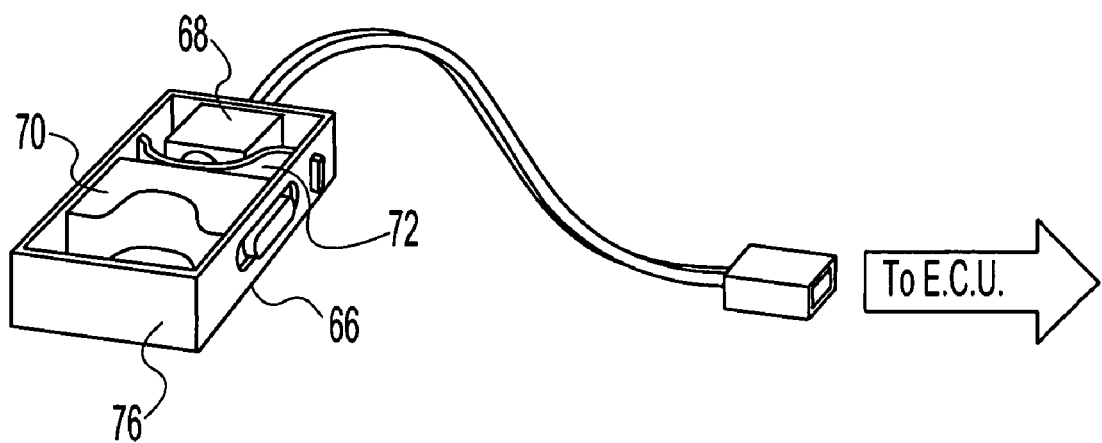
FIG. 4 is a perspective view of the tension device of FIG. 3.

The tension or deflection device 66 is used to monitor operation of the flexible member 34. As best shown in FIGS. 3 and 4, the illustrated tension device 66 is mounted in the cavity of the housing 44 such that the tension device 66 is aligned with the passage 50 in the bottom of the housing 44. The illustrated tension device 66 has a switch portion 68 and a spring-biased probe or guide portion 70 that is oriented substantially perpendicular to the switch portion 68. The probe portion 70 is resiliently biased by a biasing member 72 which can take various forms including a leaf spring, a coil spring, or the like. In the typical situation, that is with the tire rim 11a engaging the tire plate 20, the weight of the spare tire 11 and rim 11a on an extended length or stretched flexible member 34 forms a tension force in the flexible member 34. As the flexible member 34 is near the end of it retraction travel as determined by the position sensor 60, the tension device 66 is activated. The probe portion 70 is moved substantially perpendicular to the axis of travel 74 of the flexible member 34 until the biased probe portion 70 is pressed against the flexible member 34 to deflect the flexible member 34 a predetermined distance from its free state condition as best shown in FIGS. 5A, 5B and 5C. After the probe portion 70 moves the flexible member 34 to the deflected position, as tension increases in the flexible member 34, the probe portion 70 moves toward the switch portion 68. The deflection in the flexible member 34 from the axis of travel 74 is reduced because the tension force causes the flexible member 34 to move from the deflected position towards an undeflected condition or free state condition. The reduction in deflection is proportional to the tension force level in the flexible member 34. It is noted that the tension device 66 can take on many forms within the scope of the present invention including a contact switch, a potentiometer, and an on-off switch.

Figure 5D:
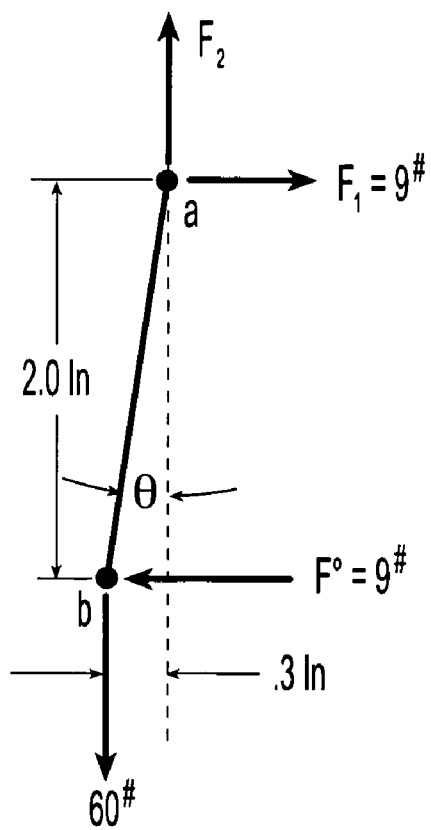
FIG. 5D is a free body force diagram for example 1 of FIG. 5A.
Figure 5E:
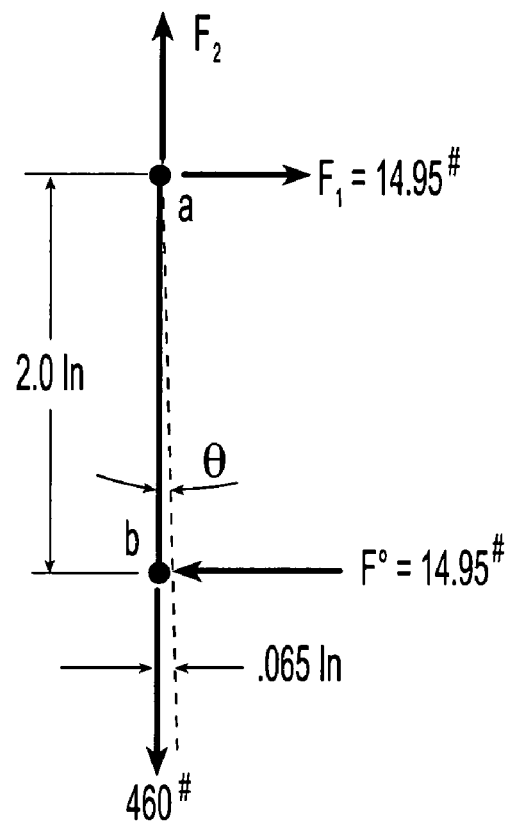
FIG. 5E is a free body force diagram for example 2 of FIG. 5C.
Figure 5G:
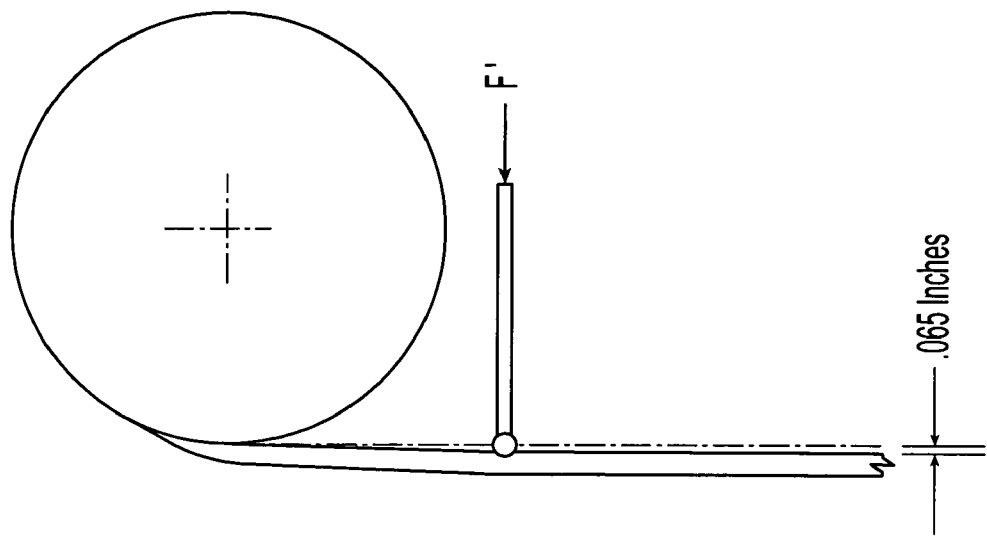
FIG. 5G diagrammatic view showing cable deflection for example 2 of FIGS. 5C and 5E.
Figure 5F:
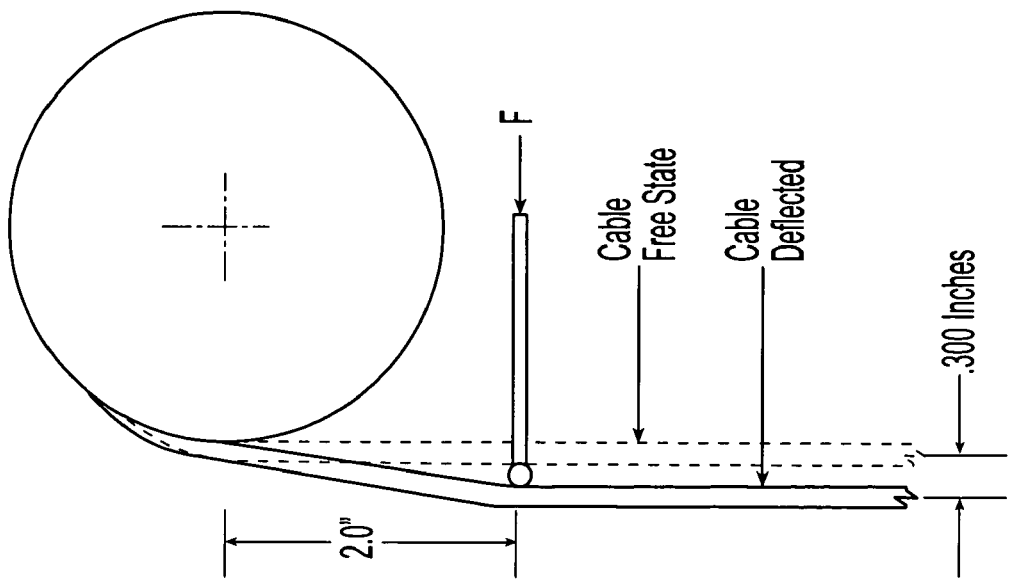
FIG. 5F diagrammatic view showing cable deflection for example 1 of FIGS. 5A and 5D.
Figure 5H:
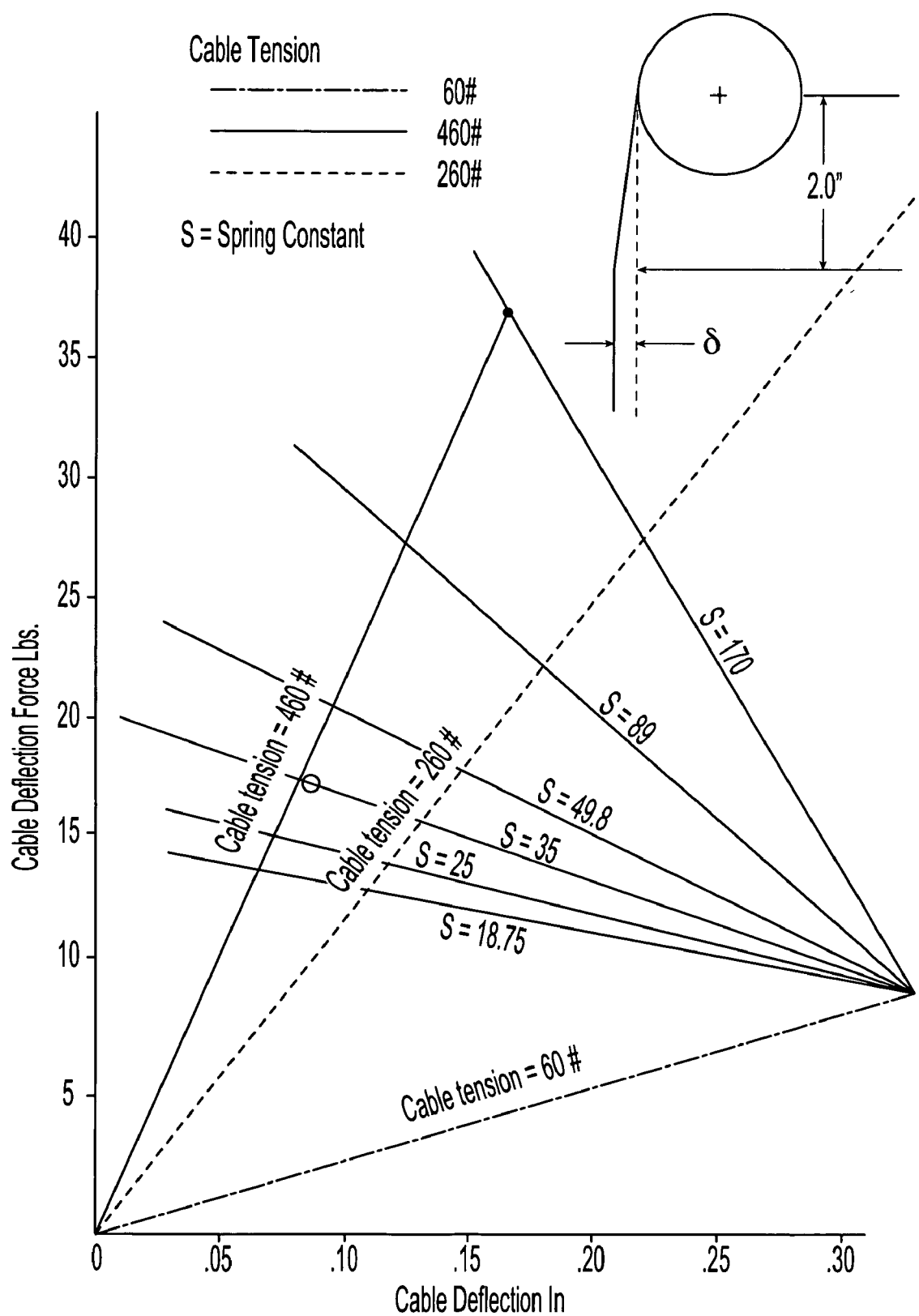
FIG. 5H is a graphical representation of cable deflection force versus cable deflection for various spring constants and cable tensions.
Figure 5I:
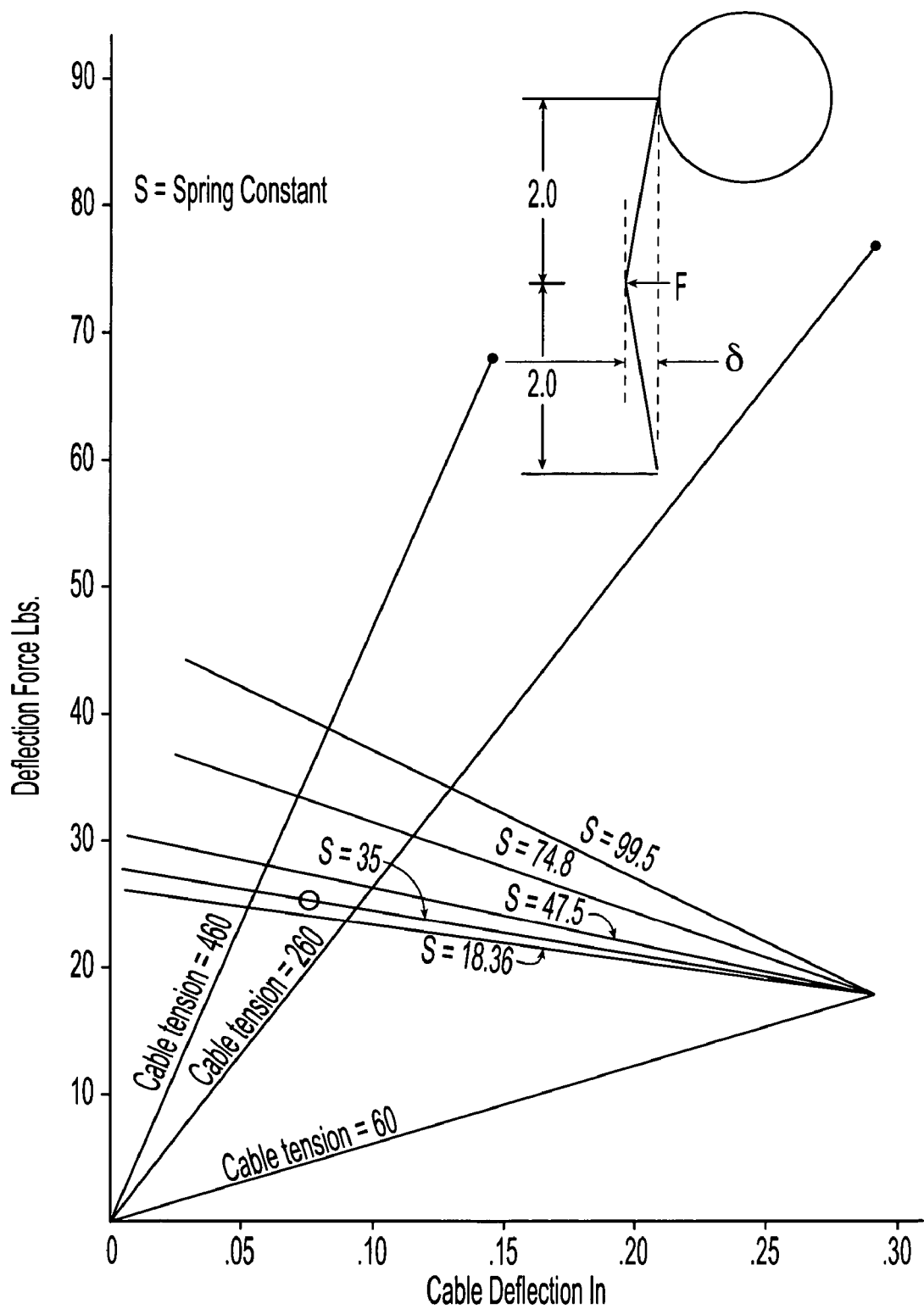
FIG. 5I is a graphical representation of cable deflection force versus cable deflection for various spring constants with ends constrained two inches from the midpoint.

By way of non-limiting examples, FIGS. 5A and 5B show a force at a point two inches below the tangent point of the flexible member 34 with the reel 32 where the spare tire weighs sixty pounds (Example 1). FIG. 5C shows such a force where the tension in the flexible member and the spare tire 11 is four hundred and sixty pounds (Example 2). FIG. 5D shows a free body free body diagram for the flexible member deflection and tension for the first example. FIG. 5E shows a free body diagram for the second example. A comparison of Example 1 and Example 2 is shown in FIGS. 5F and 5G. The relationship between deflection force and cable deflections for various flexible member tension force levels and spring constants where the flexible member 34 is two inches below the tangent point with the reel 32 is shown in FIG. 5H and with the flexible member 34 constrained two inches above and below a mid-point is shown in FIG. 5I. The spring biased probe portion 70 of the tension device 66 is moved into and away from the flexible member 34 as the flexible member 34 is being moved vertically upward to the storing position in the vehicle. The illustrated switch portion 68 is a contact switch or analog sensor that provides a signal that indicates a predetermined level of tension for a known deflection in the flexible member 34. Alternatively, movement of the probe portion is connected to a continuous output transducer that provides a signal that is related to the flexible member tension force. The signal is processed by the ECU 56 which monitors the level of tension force in the flexible member 34 as discussed hereinabove to ensure that the desired flexible member tension force is present in the tire carrier assembly 10 during a tire storage period. Optionally, a carrier of the tension device 66 is formed with a ring portion 76 to encircle the flexible member 34. The ring portion 76 ensures that the flexible member 34 remains in close proximity with the probe portion 70 of the tension device 66 when the flexible member 34 is slack or unloaded.

Optionally, the ECU 56 monitors the flexible member tension device 66 to periodically ascertain the tension level in the flexible member 34 when the tire is in the stored position to ensure that the predetermined desired tension level is maintained in the flexible member 34 and the tire carrier assembly 10. If the flexible member tension level is found to be below a predetermined or threshold force value, the ECU receives a signal from the tension device 66 indicating that a less than desirable flexible member tension force level exists. Then, the ECU 56 sends a signal to the motor 40 to rotate the reel 32 to sufficiently increase the tension in the flexible member 34 to the desired level. Additionally, the ECU 56 may be optionally designed to incorporate various safety devices, such as a park brake switch 80, a key-in switch 82, or the like, to prohibit the lowering of the tire carrier 12 unless an appropriate signal from an operational function condition-monitoring device is received. Examples of such operational conditions include when the engine ignition is turned off, the automatic transmission is in a locked condition, the vehicle wheel speed is zero, the manual transmission gear speed is zero, a park brake is turned off, the key in the ignition switch is turned off, and the vehicle speed is zero. Thus the ECU 56 self-regulates movement of the winch assembly 14 as it moves the spare tire 11 from the accessing position to the stored position.

As discussed hereinabove, the position sensor 60 of the monitoring device 18 senses flexible member movement and ensures that the proper length of the flexible member 34 is unwound from the reel 32 so as to feed out sufficient length to permit the spare tire 11 to be moved to the accessing position to allow the spare tire 11 to be removed from the tire carrier 12. As the spare tire is being lowered, the LED device 62 blinks to indicate operation of the tire carrier assembly 10 to the operator. The LED device 62 remains illuminated while the tire carrier 12 is in the accessing position. Any electrical faults detected by the ECU 56 cause the LED device 62 to remain illuminated and would remain illuminated while the ignition is on or the vehicle transmission is moved from a park position until the fault is cleared or the other operational signals described above are received.

During operation of the tire carrier assembly 10, the spare tire 11 is normally secured in the motor vehicle in the stored position. When the operator desires to lower the spare tire 11 and tire carrier 12 from the storing position to the accessing position, the operator presses operator input device 58 for a predetermined time interval, such as by way of non-limiting example, at least 50 milliseconds in the required direction and then the operator releases the device 58. This causes a signal to be sent to the ECU 56 that sends a signal to start rotation of the motor 40 in one direction. The motor 40 causes the winch shaft 30 to rotate the reel 32 and unwind the flexible member 34 from the reel 32 and through the passage 50 in the bottom of the housing 44 so as to move vertically downward toward the ground surface. The monitoring device 18 senses movement of the flexible member 34 and ensures that the proper length of the flexible member 34 is unwound from the reel 32 so as to feed out sufficient flexible member length to permit the spare tire 11 to be moved from the stowed position to the accessing position (usually on the ground surface) and to allow the spare tire 11 to be removed from the tire carrier 12. As the spare tire 11 is being lowered, the LED device 62 blinks to indicate operation of the tire carrier assembly 10 to the operator. The LED device 62 remains illuminated while the tire carrier 12 is being moved to the accessing position and/or the tire carrier is in the accessing position. Any faults detected by the ECU 56 cause the LED device 62 to remain illuminated and stay illuminated while the ignition is on or the vehicle transmission is moved from a park position, until the fault is cleared.

When the operator desires to raise the spare tire or move the spare tire from the accessing position to the storing position, the operator presses the operator input device 58 in the required direction for a predetermined time interval, such as by way of non-limiting example, at least fifty milliseconds and then releases the input device 58. The device 58 sends a signal to the ECU 56 that sends a signal to start rotation of the motor 40 in another or reverse direction. This permits the flexible member 34 to wind around the reel 32. The position sensor 60 monitors the rotation of the reel 32 to ensure that the proper length of flexible member 34 is wound on the reel 32 so as to take up a sufficient length to permit the spare tire 11 to be moved from the accessing position to the storing position. A the tire carrier 12 is being raised from the accessing position to the storing position, the LED device 62 blinks to indicate operation of the tire carrier assembly 10 to the operator. The LED device 62 remains illuminated until the tire carrier is in the storing position.

The flexible member 34 retracts until a predetermined length is wound on the reel 32 as determined by a signal from the position sensor 60. Optionally, the flexible member tension level is limited by the ECU 56 during initial flexible member retraction in order to prevent or reduce the possibility of trapping a person or other obstruction between the spare tire 11 and the vehicle. The ECU 56 does this by monitoring changes in the signal from the position sensor 60 and/or changes in a signal corresponding to the motor current as measured within the ECU 56 and causing the motor 40 to stop rotating the reel 32 when the signal exceeds a predetermined threshold level. Further optionally in the above situation, the motor 40 can be made to reverse rotation of the motor 40 by the ECU 56 to cause the motor 40 to lower the tire carrier to the accessing position, such as for example, if the ECU 56 detects an abnormal operational condition.

Figure 6:
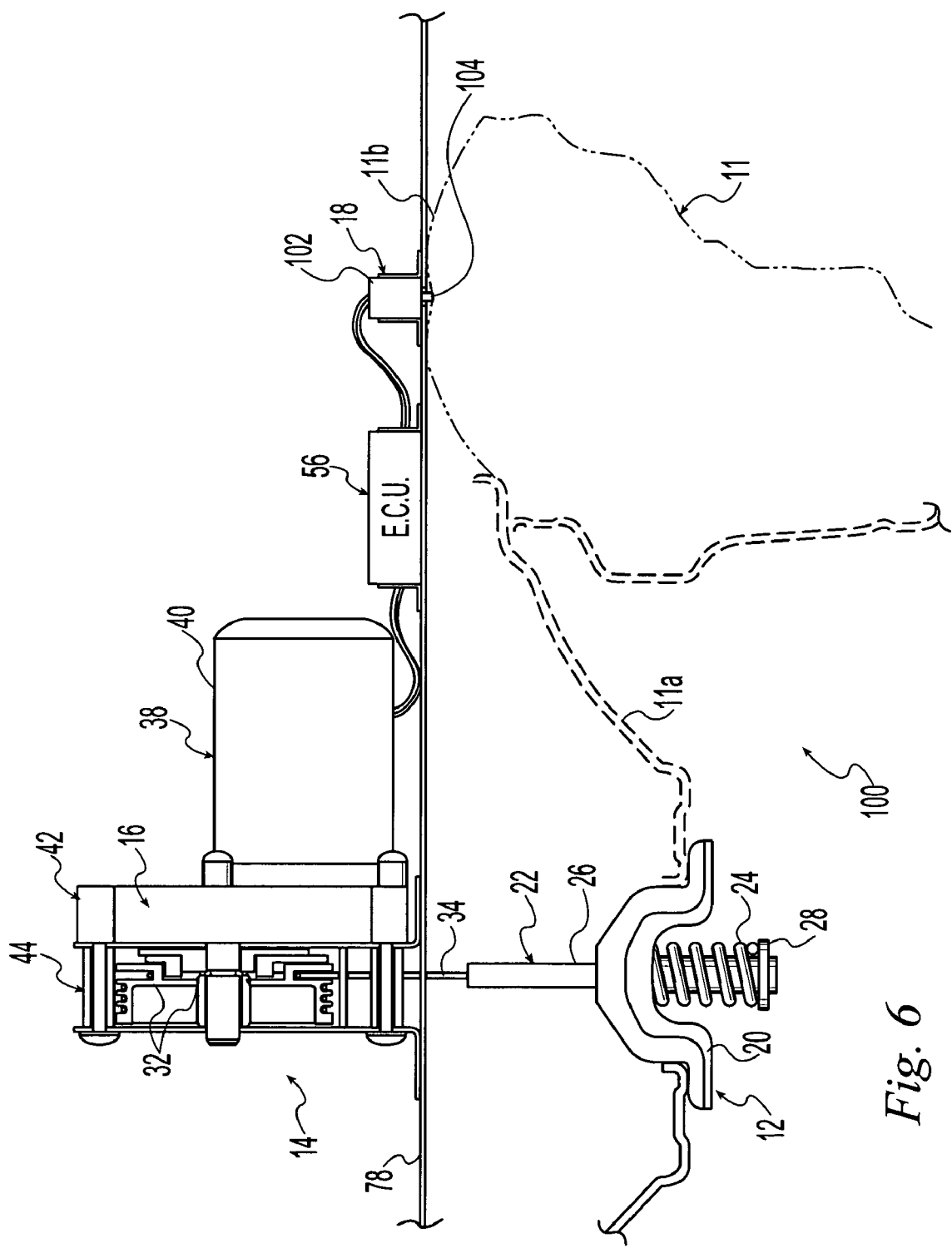
FIG. 6 is an elevational view of a tire carrier assembly according to an alternative preferred embodiment of the present invention.

FIG. 6 illustrates a tire carrier assembly 100 according to an alternative preferred embodiment of the present invention. The tire carrier assembly 100 is substantially the same as the tire carrier assembly 10 described hereinabove in detail and the same reference numbers are utilized to indicate the same structure as previously described except as now noted. In this embodiment, the monitoring device 18 includes a force switch 102 that is mounted to the vehicle floor pan 78. The force switch 102 is positioned so as to be aligned with the axis of travel 74 of the flexible member 34 and to interact with the spare tire 11. The illustrated force switch 102 has a spring-loaded micro switch with a plunger 104 extending down from its body. The tip of the plunger 104 of the force switch 102 has a bearing surface of a predetermined area so that when it is struck by another object, the force of the object striking the plunger is measured. Thus, when the flexible member 34 raises the spare tire 11, the spare tire 11 moves against the tip of the plunger 104. As the spare tire 11 continues its upward movement, the force switch 102 generates a signal that is proportional to the force of the abutting surface of the spare tire 11, such as the tire side wall 11*b*. Such a force switch 102 is well known in the art. When the tip of the plunger 104 contacts the tire surface, the spare tire 11 strikes the plunger 104 and any further upward movement of the tip beyond a certain predetermined deflection causes the force switch 102 to send a signal to the ECU 56 that is proportional to the upward force of the flexible member 34. When the upward force exceeds a predetermined force, a signal is sent to the ECU 56 to stop rotation of the motor 40 and the upward travel of the flexible member 34. Optionally, the tip may include a membrane or other area interacting device to measure the force against the force switch 102. Alternatively, the monitoring device 18 includes a limit switch. When the plunger contacts the spare tire 11, the spare tire 11 and any further movement of the plunger causes the limit switch to send a signal to the ECU 56 to stop the rotation of the motor 40 and the upward movement of the flexible member 34 onto the reel 32. In all other aspects, the tire carrier assembly 100 operates as in the prior described tire carrier assembly 10.

Figure 7:
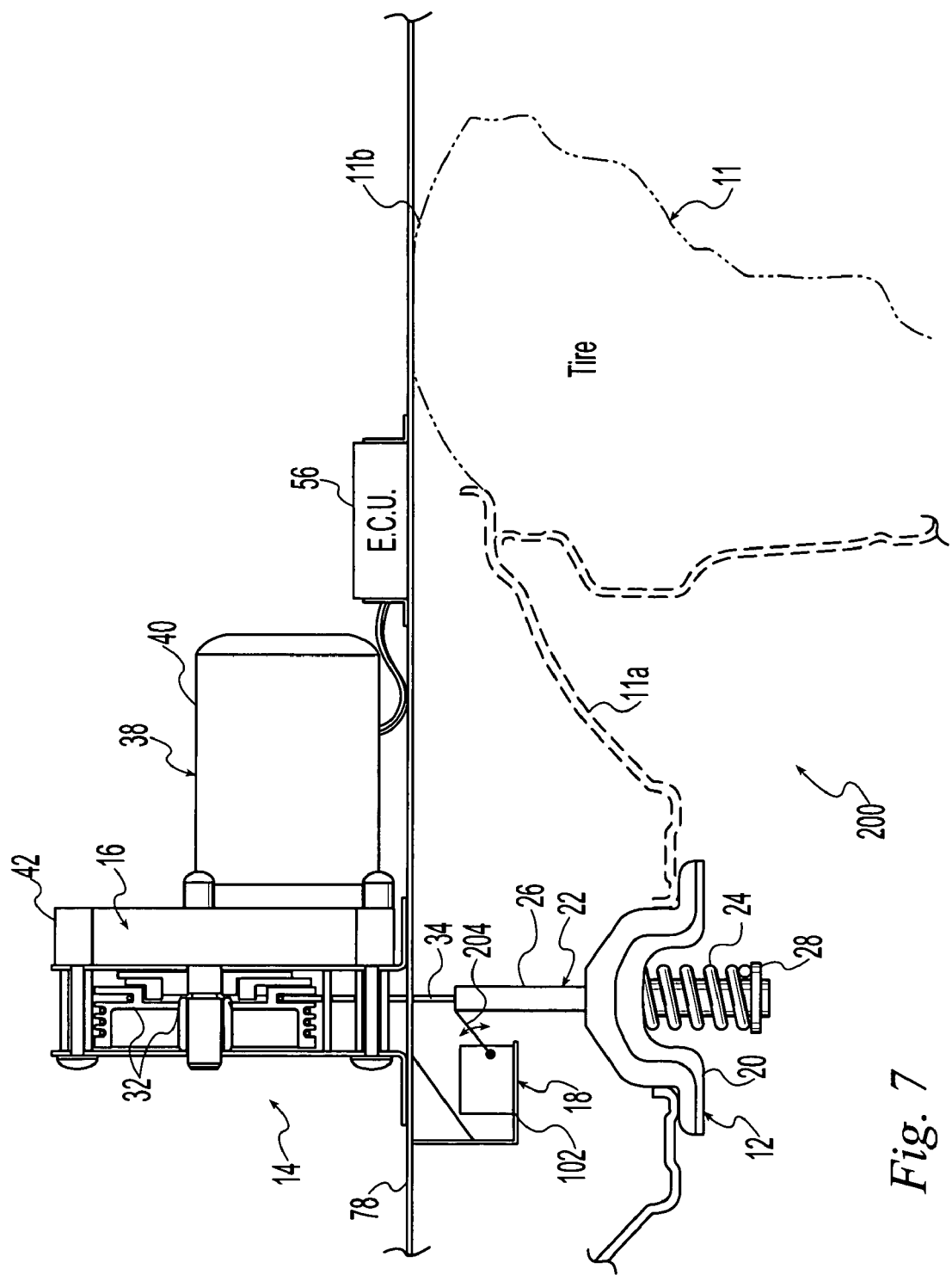
FIG. 7 is an elevational view of a tire carrier assembly according to another alternative preferred embodiment of the present invention.

FIG. 7 illustrates a tire carrier assembly 200 according to another alternative preferred embodiment of the present invention. The tire carrier assembly 200 is substantially the same as the tire carrier assembly 10 described hereinabove in detail and the same reference numbers are utilized to indicate the same structure as previously described except as now noted. In this embodiment, the monitoring device 18 includes a limit switch 202. The limit switch 202 is mounted to the bottom of housing 44 adjacent to but spaced away from the passage 50 in the housing 44 so as to permit the limit switch 202 to interact with the tubular portion 26 of the swivel 22. The illustrated limit switch 202 has a spring loaded micro switch with a pivotably mounted plunger 204 extending from its body. The limit switch 202 is positioned adjacent to the travel of the flexible member 34 so that the plunger 204 interacts with the swivel 22 or the tire plate 20 as the flexible member 34 is raised. When the upward movement of the swivel 22 reaches a predetermined position adjacent the passage in the housing, the swivel 22 strikes the plunger 204 of the limit switch 202 and any further movement of the flexible member 34 causes the plunger 204 to pivot. Optionally, the plunger 204 includes a ring member that surrounds and captures the flexible member 34. As a result, when the plunger 204 of the limit switch 202 us moved pivotally, it sends a signal to the ECU 56 to stop rotation of the motor 40 and the upward movement or motion of the flexible member 34 onto the reel 32. It is noted that the illustrated limit switch 202 is positioned to engage the swivel 22, the limit switch can alternatively be positioned to contact other surfaces. In all other aspects, the tire carrier assembly 200 operates as the earlier described tire carrier assembly 10.

Figure 8:
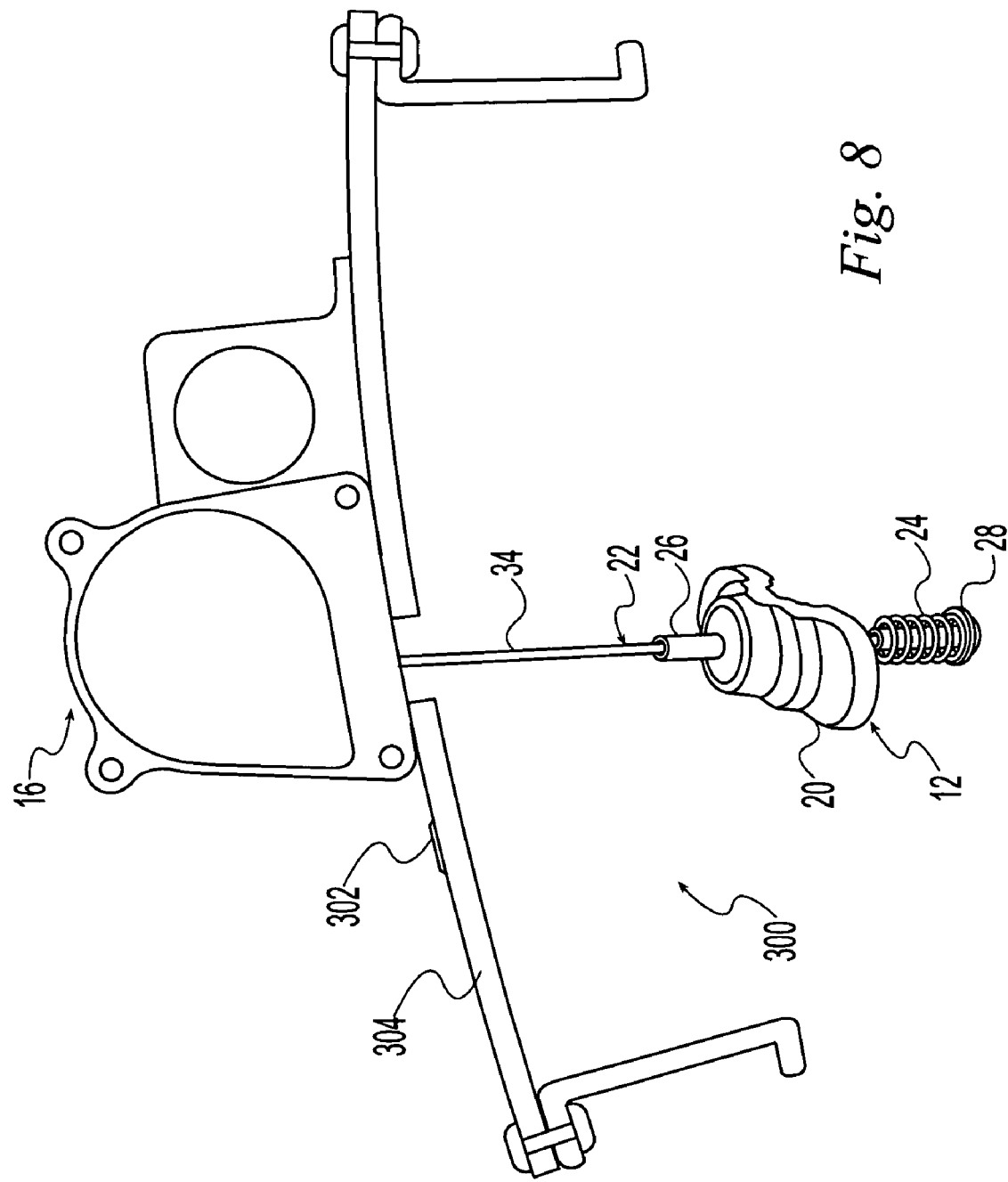
FIG. 8 is an elevational view of a tire carrier assembly according to another alternative preferred embodiment of the present invention.

FIG. 8 illustrates a tire carrier assembly 300 according to another alternative preferred embodiment of the present invention. The tire carrier assembly 300 is substantially the same as the tire carrier assembly 10 described hereinabove in detail and the same reference numbers are utilized to indicate the same structure as previously described except as now noted. In this embodiment, the monitoring device 18 includes a stress monitoring device 302. The stress monitoring device can include any conventionally known devices such as a strain gage. The use of strain gages to measure stress in a support structure or load bearing component is well known in the art. The illustrate strain gage 302 is preferably bonded at a high strain area to measure the stretching or compressing of a support structure such as, by non-limiting example, the support member 304. The resistance of strain gage 302 changes as the support member 304 stretches or compresses in response to various load changes to provide an output signal proportional to the tension level of the flexible member 34. When the spare tire 11 are supported by the tire plate 20, the weight of the spare tire 11 and rim 11a on a stretched flexible member 34 forms a tension force in the flexible member 34. The tension force is transmitted to the support member 304 as a tension or compression load. When the flexible member 34 nears the end of its retraction travel or its storing position, as determined by the position sensor 60, the stress monitoring device 302 is activated and monitored by the ECU 56. As the tension in the flexible member 34 increases, the resistance in gage 302 changes in proportion to the strain in the support member 304. The strain gage 302 is connected to a Wheatstone Bridge in a well-known manner to detect changes in resistance level in the strain gage 302. The ECU monitors the resistance in the strain gage 302 and when the resistance reaches a predetermined level, the ECU sends a signal to stop operation of the motor 40.

It has been found to be preferable that the strain gage 302 be pre-bonded to a metal substrate to facilitate its attachment to the support member 304. Suitable strain gages 302 are available from Vishay Measurement Group of Raleigh, N.C.

The ECU 56 preferably monitors the stress monitoring device 302 periodically to ascertain the tension level in the flexible member 34 while the spare tire 11 is in the storing position to ensure that the desired tension is maintained in the flexible member 34 and the assembly 300. If the flexible member tension is found to be below a threshold force value, the ECU 56 sends a signal to the motor 40 to rotate the reel 32 and increase the tension in the flexible member 34 to the desired level. In all other aspects, the tire carrier assembly 300 operates as the earlier described tire carrier assembly 10.

Figure 9:
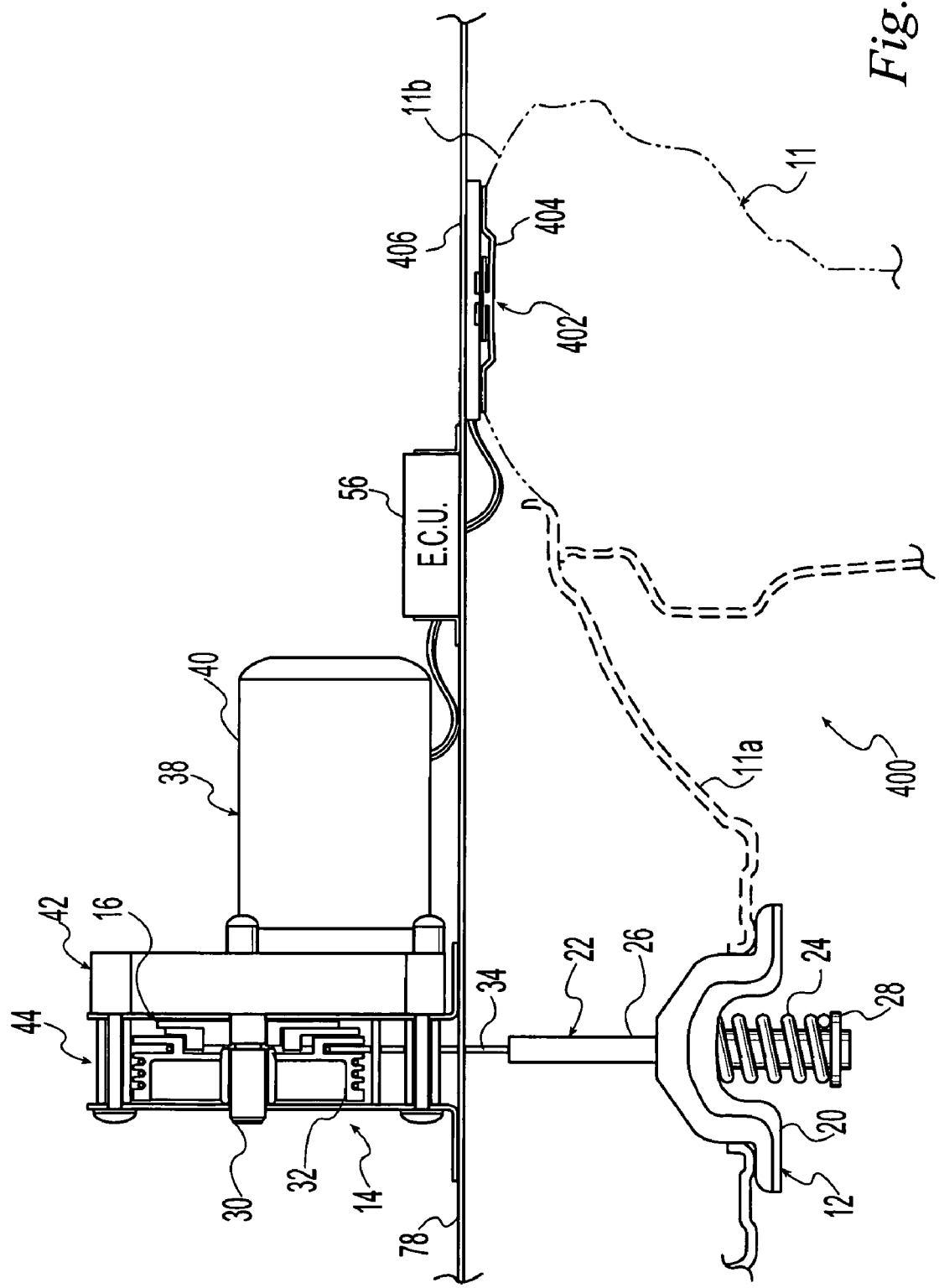
FIG. 9 is an elevational view of a tire carrier assembly according to another alternative preferred embodiment of the present invention.
Figure 10:
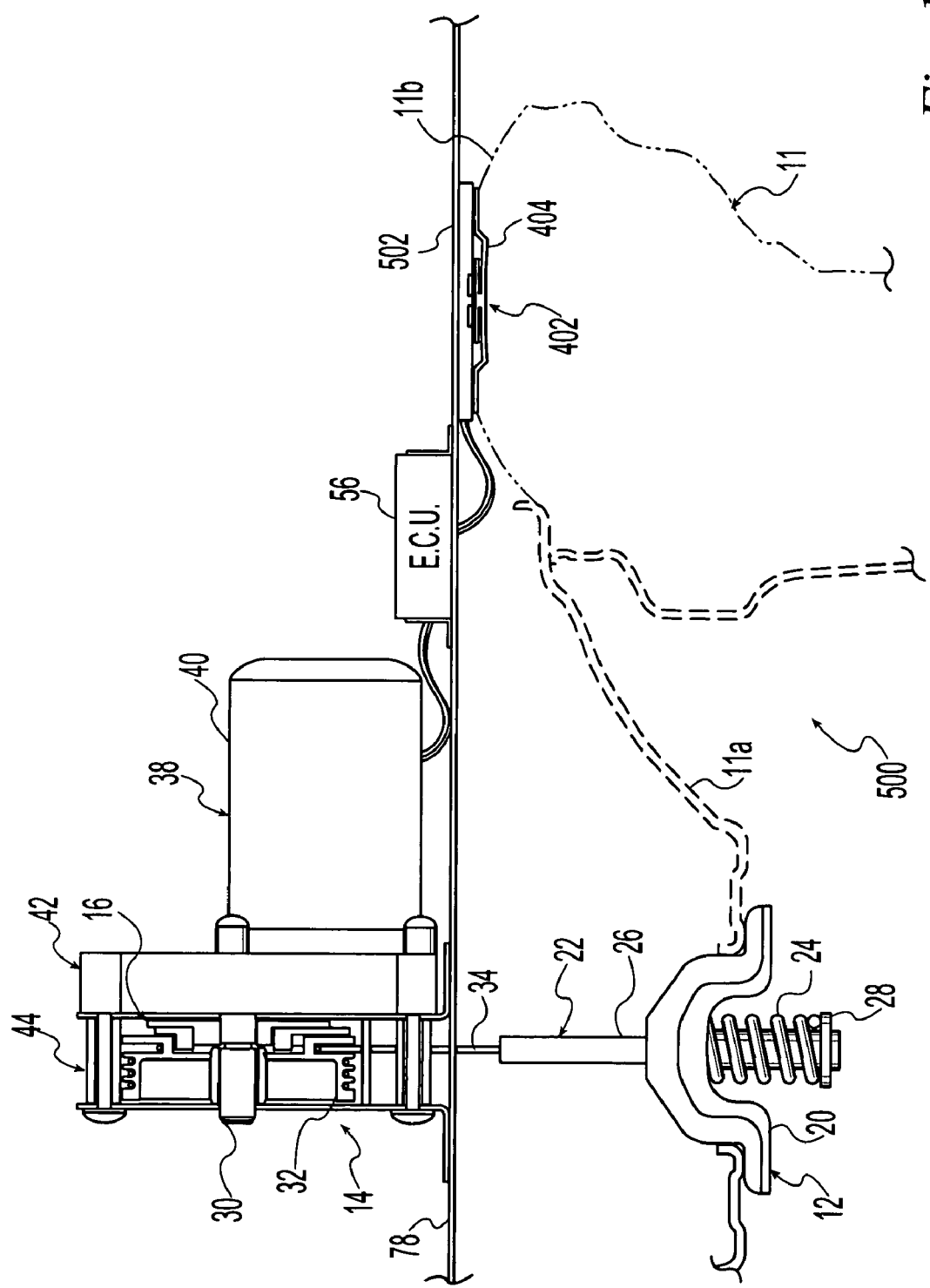
FIG. 10 is an elevational view of a tire carrier assembly according to another alternative preferred embodiment of the present invention.

FIGS. 9 and 10 illustrate tire carrier assemblies 400 and 500 according to additional alternative preferred embodiments of the present invention. The tire carrier assemblies 400 and 500 are substantially the same as the tire carrier assembly 10 described hereinabove in detail and the same reference numbers are utilized to indicate the same structure as previously described except as now noted. In this embodiment, the monitoring device 18 includes a pressure sensor assembly 402 that is mounted to the vehicle floor pan 78 to interact with the spare tire 11 when near its stored position. The pressure sensor assembly 402 includes a diaphragm 404 and can take many forms including a pressure switch 406 and a pressure sensor 502. One such pressure sensor assembly 402 uses a transistor such as, by way of non-limiting example, described in U.S. Pat. Nos. 6,388,299 and 4,873,871, the disclosures of which are expressly incorporated herein in their entireties by reference. Another pressure sensor assembly uses a semiconductor pressure transducer such as, by way of non-limiting example; described in U.S. Pat. No. 4,812,888, the disclosure of which is expressly incorporated herein in its entirety by reference. Yet another pressure sensor assembly uses a piezoresistive sensor such as, by way of non-limiting example, a sensor available Kristal Instruments AG, of Winterhur, Switzerland. When the flexible member 34 is used to raise the spare tire 11, the side wall 11b of the spare tire 11 touches the diaphragm 404 of the pressure sensor assembly 402. As the spare tire 11 continues its upward movement, the pressure sensor assembly 402 generates a signal that is proportional to the force if the abutting surface of the spare tire 11. Any further upward movement beyond a certain predetermined pressure level causes the pressure switch 406 to act as a limit switch and send a signal to the ECU 56 to stop rotation of the motor 40 and the upward travel of the flexible member. Alternatively, if the sensor assembly 402 is a pressure sensor 502, the sensor assembly 402 acts as a pressure sensor to provide a signal that is proportional to the pressure sensed by the pressure sensor 502. The ECU 56 preferably continues to monitor the pressure sensor 502 once the tire carrier 12 is in the storing position and in the event that the pressure level sensed by the pressure sensor 502 falls below a threshold pressure level, the ECU 56 receives a signal from the pressure sensor 502 indicating that a less than desirable pressure is being exerted by the spare tire 11 against the diaphragm 404. Then, the ECU 56 sends a signal to the motor 40 to rotate the reel 32 to raises the spare tire 11 so that the spare tire 11 exerts a sufficient increase in pressure to the desired predetermined pressure level. In other aspects, the carriers 400, 500 operate the same as the earlier described tire carrier assembly 10.

Figure 11:
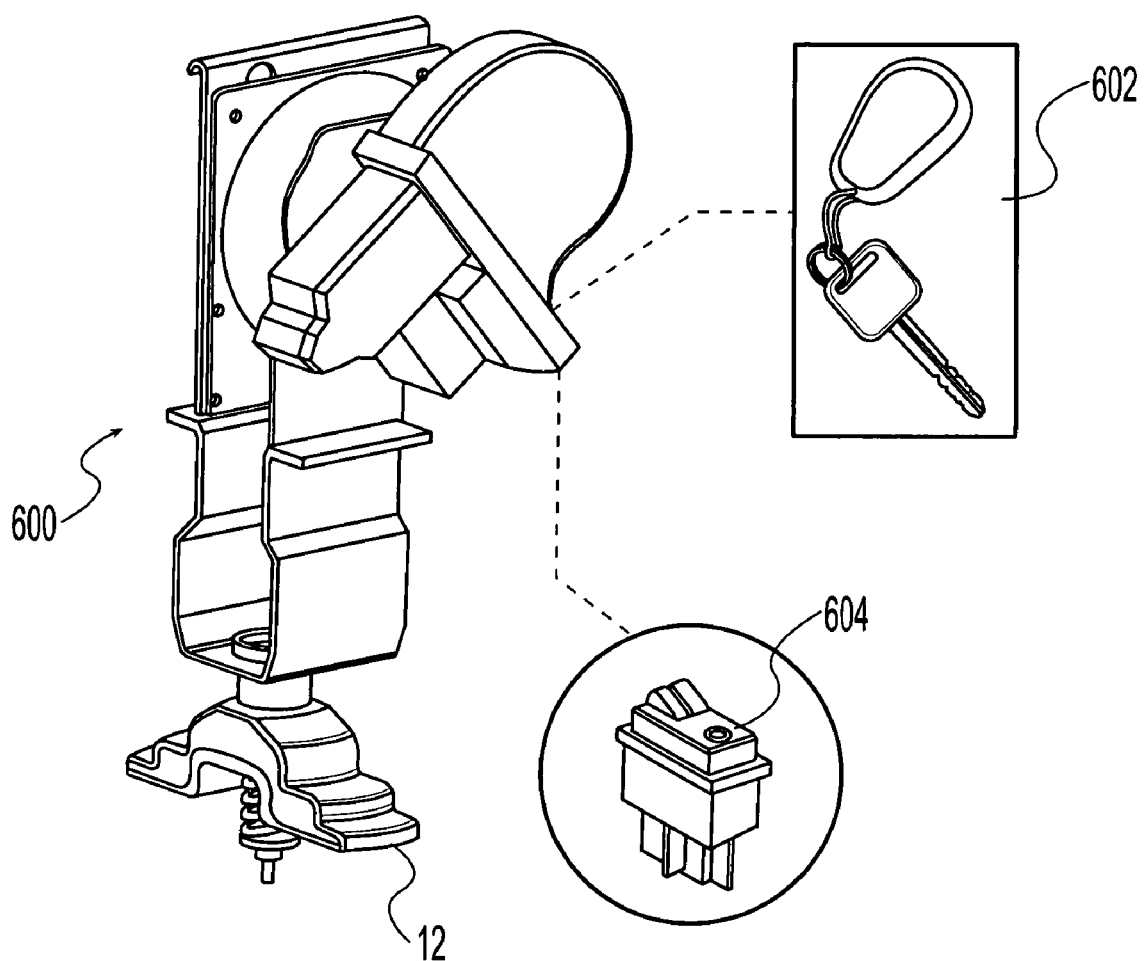
FIG. 11 is a diagrammatic view of a tire carrier assembly according to another alternative preferred embodiment of the present invention.

FIG. 11 illustrates a tire carrier assembly 600 according to another alternative preferred embodiment of the present invention. The tire carrier assembly 600 is substantially the same as the tire carrier assembly 10 described hereinabove in detail and the same reference numbers are utilized to indicate the same structure as previously described except as now noted. In this embodiment, the operator input device 58 includes a wireless key remote 602 in addition to a hard wired toggle switch 604. The operator can use either the wireless key remote o the hard wired toggle switch to raise or lower the tire carrier. The wireless key remote functions in the same manner as known remotes for operating vehicle locks and the like. In all other aspects, the tire carrier assembly 600 operates as the earlier described tire carrier assembly 10.

Figure 12:
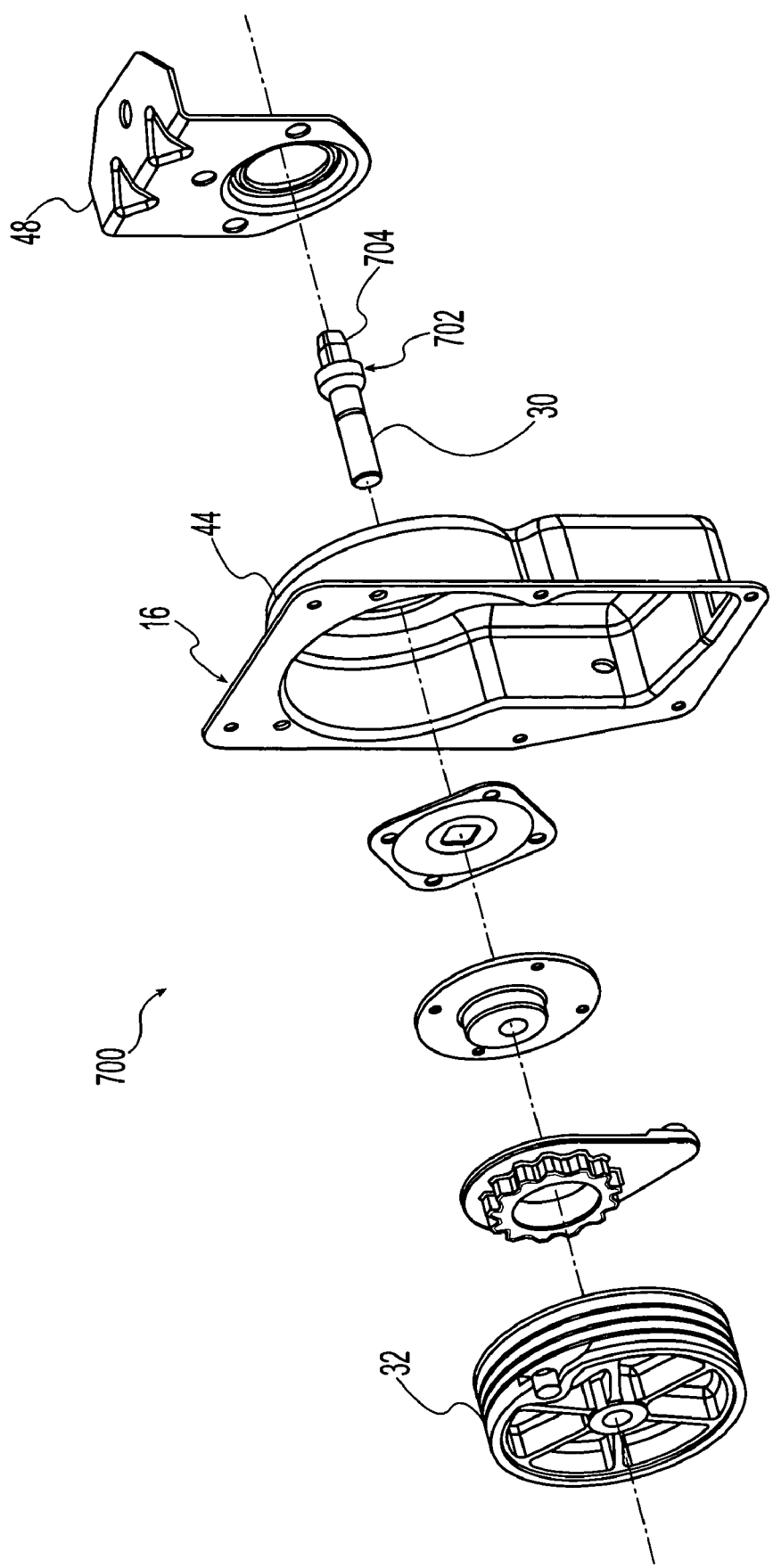
FIG. 12 is an exploded perspective view of a tire carrier assembly according to another alternative preferred embodiment of the present invention.
Figure 13:
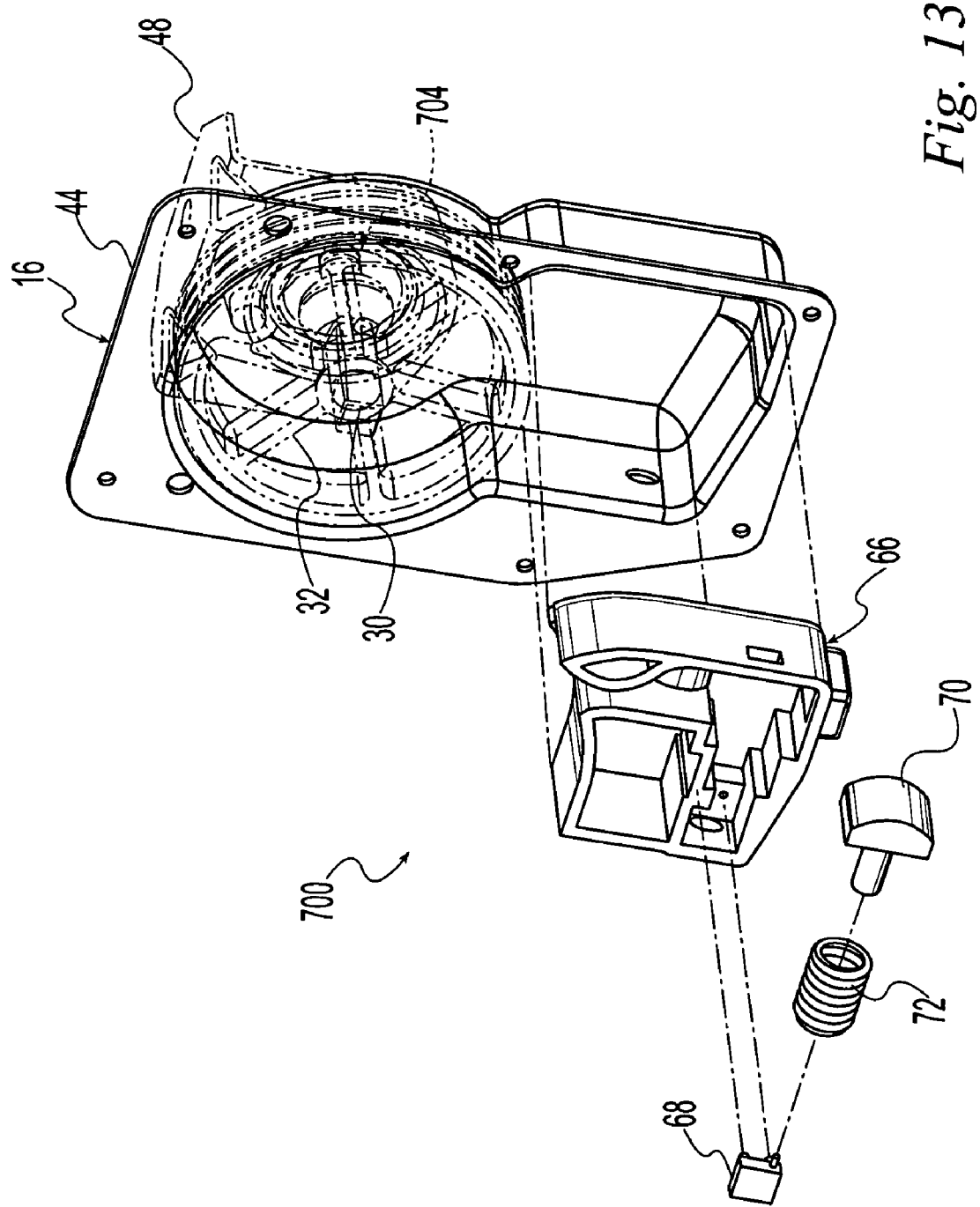
FIG. 13 is a partially exploded view of the tire carrier assembly of FIG. 12.

FIGS. 12 and 13 illustrate a tire carrier assembly 700 according to another alternative preferred embodiment of the present invention. The tire carrier assembly 700 is substantially the same as the tire carrier assembly 10 described hereinabove in detail and the same reference numbers are utilized to indicate the same structure as previously described except as now noted. In this embodiment, the actuation member 38 for the winch assembly 14 is a manual device 702 rather than the motor 40. The illustrated manual device includes a driver head 704 formed in the end of the shaft 30. The driver head 704 is sized and shaped to cooperate with a drive lever or handle so that the operator can manually rotate the shaft 30 and the reel 32 using the drive lever in order to manually raise and lower the tire carrier. The tension device 66 is utilized to trigger the warning lamp 64 when the flexible member does not have the predetermined tension level. In all other aspects, the tire carrier assembly 700 operates as the earlier described tire carrier assembly 10.

From the foregoing disclosure and detailed description of certain preferred embodiments of the present invention, it is apparent that the features of each the various embodiments can be utilized in combination with each of the other embodiments.

From the foregoing disclosure and detailed description of certain preferred embodiments of the present invention, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A tire carrier assembly for storing a spare tire on a vehicle, said tire carrier assembly comprising, in combination:
    a carrier adapted for supporting the spare tire;
    a winch operatively connected to the carrier to raise and lower the carrier between a stowed position wherein the carrier is inaccessible and a deployed position wherein the carrier is accessible;
    wherein the winch has a flexible member secured to the carrier and an electric motor selectively raises and lowers the carrier between the stowed and deployed positions;
    a monitoring device adjacent the winch and providing a signal indicating when the carrier is in the stowed position; and
    a control module operably connected to the monitoring device and receiving the signal so that the control module automatically stops the motor when the carrier reaches the stowed position.

2. The tire carrier assembly according to claim 1, wherein the monitoring device includes a switch portion and a biased probe engaging the flexible member.

3. The tire carrier assembly according to claim 1, wherein the monitoring device engages and deflects the flexible member to determine a tension force level in the flexible member.

4. The tire carrier assembly according to claim 1, wherein the monitoring device is one of a contact switch and an analog sensor.

5. The tire carrier assembly according to claim 1, wherein the control module is programmed to monitor a tension force level in the flexible member and to send a signal to the winch to stop further movement of the carrier toward the stowed position when the tension force level exceeds a predetermined level.

6. The tire carrier assembly according to claim 1, wherein the winch has a reel upon which the flexible member is wound and unwound to raise and lower the carrier and the control module is programmed to automatically activate the motor to rotate the reel to increase a tension force level in the flexible member in response to a signal received from the monitoring device indicating the carrier is undesirably out of the stowed position.

7. The tire carrier assembly according to claim 1, wherein the control module is operatively connected to a condition monitoring device and the control module is programmed to prevent the winch from deploying the carrier in response to receiving one signal from the condition monitoring device and is programmed to permit the winch to deploy the carrier in response to receiving another signal from the condition monitoring device.

8. The tire carrier assembly according to claim 1, further comprising a motion monitoring device to sense movement of the flexible member.

9. The tire carrier assembly according to claim 1, wherein the monitoring device provides another signal indicating when the carrier is in the deployed position and the control module receives the another signal so that the control module automatically stops the motor when the carrier reaches the deployed position.

10. A tire carrier assembly for storing a spare tire on a vehicle, said tire carrier assembly comprising, in combination:
    a carrier adapted for supporting the spare tire;
    a winch having a flexible member operatively connected to the carrier and having an actuation member connected to the flexible member to raise and lower the carrier between a first position and a second position relative to the vehicle;
    a monitoring device adjacent the flexible member to measure tension in the flexible member when the tire carrier is raised from the first position to the second position;
    a control module operably connected to the monitoring device to monitor a tension force level in the flexible member as the tire carrier moves from the first position toward the second position; and
    wherein the control module is programmed to prevent further movement of the carrier toward the second position when the tension force level in the flexible member exceeds a predetermined tension level.

11. The tire carrier assembly according to claim 10, wherein the monitoring device includes a probe and a switch to deflect the flexible member and determine the tension force level in the flexible member.

12. The tire carrier assembly according to claim 11, wherein the monitoring device monitors the tension force level to maintain a predetermined tension force level in the flexible member when the carrier is in the first position.

13. A tire carrier assembly for storing a spare tire on a vehicle, said tire carrier assembly comprising, in combination:
   a carrier adapted for supporting the spare tire;
   a winch having a flexible member operatively connected to the carrier and having one of an electric motor and a manual device connected to the flexible member to raise and lower the carrier;
   a monitoring device adjacent the winch to control movement of the carrier between a stowed position wherein the carrier is inaccessible and a deployed position wherein the carrier is accessible; and
   wherein the monitoring device includes at least one of a tension monitoring device providing signal indicating a tension force level of the flexible member, a force switch providing a signal indicating an engagement force level of the spare tire, a hall effect sensor providing a signal indicating a deployed length of the flexible member, a hall effect device providing a signal indicating a deployed length of the flexible member, a stress monitoring device providing signal indicating a tension force level of the flexible member and a pressure sensor providing a signal indicating an engagement force level of the spare tire.

14. A method of storing and accessing a spare tire on a vehicle, comprising the steps of:
   placing the spare tire on the tire carrier, the tire carrier including a winch assembly and a flexible member, the winch assembly being connected to one of a motor and a manual device;
   raising the spare tire from a deployed position wherein the spare tire is accessible toward a stowed position wherein the spare tire is inaccessible;
   monitoring a current condition including at least one of a tension force level in the flexible member, a stress level in a member supporting the tire carrier, an engagement force level of the spare tire, and a deployed length of the flexible member; and
   discontinuing the raising step when the current condition corresponds to a predetermined level.

15. The method according to claim 14, further comprising the step of monitoring movement of the tire carrier with a monitoring device selected from at least one of a tension force device, a force switch, a limit switch, a hall effect switch, a hall effect sensor, a stress monitoring device, a pressure sensor, a contact position sensor, and a non-contact position sensor.

16. A method of storing and accessing a spare tire using a tire carrier on a vehicle, comprising the steps of:
   moving the tire carrier from a stowed position wherein the tire carrier is inaccessible to a deployed position wherein the tire carrier is accessible using a flexible member;
   measuring a current condition including one of a tension force level in the flexible member, a stress level in a member supporting the tire carrier, an engagement force level of the spare tire, and a deployed length of the flexible member; and
   monitoring the current condition in order to control movement of the tire carrier from the deployed position toward the stowed position.

17. The method according to claim 16, further comprising the step of controlling the moving step with one of a motor and a manual device.

18. The method according to claim 16, further comprising the step of increasing tension in the flexible member when the tension force level in the flexible member falls below a predetermined level.

19. The method according to claim 16, further comprising the step of controlling the moving step with a motor and connecting the motor to a control module which self regulates movement of the tire carrier between the deployed position and the stowed position.

20. A tire carrier assembly for storing a spare tire on a vehicle, said tire carrier assembly comprising, in combination:
   a carrier adapted for supporting the spare tire;
   a winch operatively connected to the carrier to raise and lower the carrier between a stowed position wherein the carrier is inaccessible and a deployed position wherein the carrier is accessible;
   wherein the winch has a flexible member secured to the carrier and an electric motor selectively raises and lowers the carrier between the stowed and deployed positions;
   a monitoring device adjacent the winch and providing a signal indicating when the carrier is in the stowed position; and
   a control module operably connected to the monitoring device and monitoring the signal so that the control module automatically activates the motor to raise the carrier back to the stowed position when the signal indicates the carrier is undesirably out of the stowed position.

* * * * *